(12) United States Patent
Wu et al.

(10) Patent No.: US 9,374,114 B2
(45) Date of Patent: Jun. 21, 2016

(54) RECEIVER APPARATUS WITH BLOCKER DETECTION PATH PARALLEL WITH RECEIVER PATH AND ASSOCIATED BLOCKER DETECTION METHOD

(71) Applicant: MEDIATEK INC., Hsin-Chu (TW)

(72) Inventors: Tzung-Han Wu, Hsinchu (TW); Chinq-Shiun Chiu, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 142 days.

(21) Appl. No.: 14/252,790

(22) Filed: Apr. 15, 2014

(65) Prior Publication Data

US 2015/0295603 A1    Oct. 15, 2015

(51) Int. Cl.
*H04B 1/10* (2006.01)

(52) U.S. Cl.
CPC ............. *H04B 1/1027* (2013.01); *H04B 1/109* (2013.01); *H04B 2001/1072* (2013.01)

(58) Field of Classification Search
CPC ......... H04B 1/10; H04B 1/1027; H04B 15/00
USPC .............. 455/226.1, 296, 303, 305, 306, 307
See application file for complete search history.

(56) References Cited

U.S. PATENT DOCUMENTS

| | | | |
|---|---|---|---|
| 7,551,910 B2 | 6/2009 | Darabi | |
| 7,904,047 B2 | 3/2011 | Darabi | |
| 7,983,642 B2 | 7/2011 | Da Graca | |
| 8,045,941 B2 | 10/2011 | Muhammad | |
| 8,086,205 B2 | 12/2011 | Thomas | |
| 8,279,974 B1 | 10/2012 | Husted | |
| 2004/0056710 A1* | 3/2004 | Pozdeev | H03F 3/602 330/51 |
| 2009/0086864 A1* | 4/2009 | Komninakis | H04B 1/10 375/346 |
| 2012/0020389 A1* | 1/2012 | Mikhemar | H04L 27/0014 375/216 |

* cited by examiner

*Primary Examiner* — Nguyen Vo
(74) *Attorney, Agent, or Firm* — Winston Hsu; Scott Margo

(57) ABSTRACT

A receiver apparatus includes a receiver path and a blocker detection path. The receiver path includes a down-converting stage. The blocker detection path includes a sensing circuit and a blocker detection circuit. The sensing circuit is arranged to sense a received radio frequency signal which has not yet been processed by the down-converting stage and generate a sensed signal accordingly. The blocker detection circuit is arranged to detect existence of a blocker signal according to the sensed signal and generate a blocker detection result indicative of the existence of the blocker signal when receiving the sensed signal.

17 Claims, 2 Drawing Sheets

RECEIVER APPARATUS WITH BLOCKER DETECTION PATH PARALLEL WITH RECEIVER PATH AND ASSOCIATED BLOCKER DETECTION METHOD

BACKGROUND

The present invention relates to detecting a blocker signal, and more particularly, to a receiver apparatus with a blocker detection path which is parallel with a receiver path for detecting blockers on the receiver path, and a related blocker detection method.

A radio frequency (RF) receiver is widely applied to wireless communications devices. In an RF receiver, some unwanted signals such as out of band signals are usually received along with target signals at the receiver inputs. These unwanted signals are known as interference or blocker signals (blockers). If they are not eliminated or attenuated, signal distortion may occur in the RF receiver, and performance of the receiver apparatus will deteriorate.

Therefore, there is a need for an apparatus and a method thereof for detecting blocker signals within an RF receiver, which can adjust the gain of the RF receiver for achieving improved communications quality.

SUMMARY

One of the objectives of the present invention is to provide a receiver apparatus with a blocker detection path parallel with a receiver path for detecting blockers on the receiver path, and a related blocker detection method, to solve the aforementioned issues.

According to an embodiment of the present invention, a receiver apparatus is provided. The receiver apparatus includes a receiver path and a blocker detection path. The receiver path includes a down-converting stage. The blocker detection path includes a sensing circuit and a blocker detection circuit. The sensing circuit is arranged to sense a received radio frequency signal which has not yet been processed by the down-converting stage and generate a sensed signal accordingly. The blocker detection circuit is arranged to detect existence of a blocker signal according to the sensed signal and generate a blocker detection result indicative of the existence of the blocker signal when receiving the sensed signal.

According to another embodiment of the present invention, a blocker detection method applied to a receiver path including a down-converting stage is provided. The blocker detection method includes: sensing a received radio frequency signal which has not yet been processed by the down-converting stage, and generating a sensed signal accordingly; and when receiving the sensed signal, detecting existence of a blocker signal according to the sensed signal, and generating a blocker detection result indicative of the existence of the blocker signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
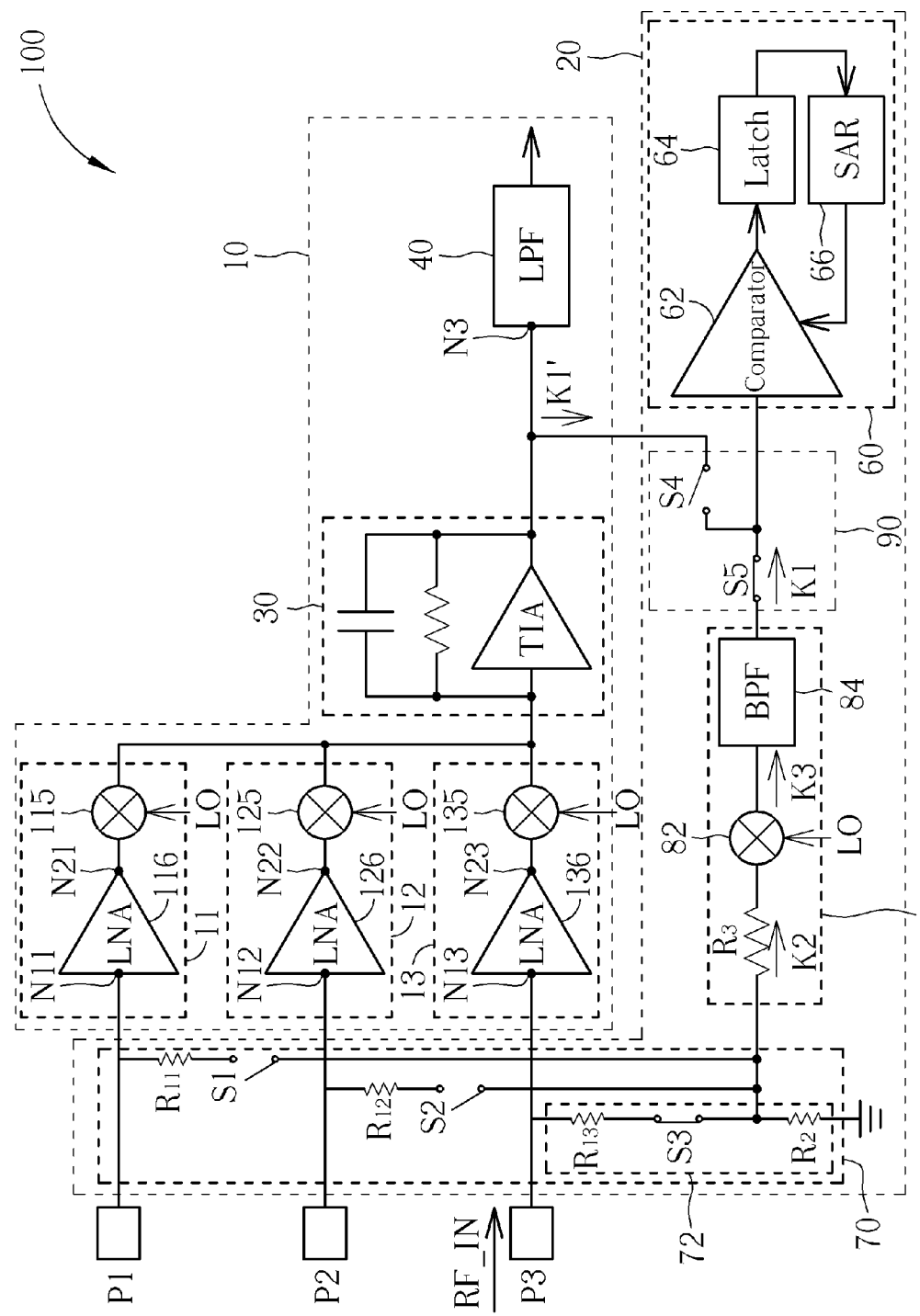
FIG. 1 is a diagram illustrating a receiver apparatus according to an embodiment of the present invention.

Please refer to FIG. 1, which is a diagram illustrating a receiver apparatus 100 according to an embodiment of the present invention. Please note that FIG. 1 is just an example for illustrative purposes, and is not a limitation to the present invention. For example, the band pass filter (BPF) 84 can be replaced by a low pass filter (LPF) or a high pass filter (HPF). Besides, the detecting circuit 60 is not limited to the circuit depicted in FIG. 1, but can also be a simple analog-to-digital convertor (ADC), or any other circuit that can detect voltage or current signals, although an ADC may consume more area or more direct current (DC) power. As shown in FIG. 1, the receiver apparatus 100 includes a receiver path (e.g. a main path) 10 and a blocker detection path (e.g. an auxiliary path) 20 connected in a parallel fashion. The receiver path 10 includes a plurality of front-ends 11-13, a current-to-voltage converter (e.g. a transimpedance amplifier (TIA) 30), and a frequency selective filter (e.g. a low pass filter (LPF) 40), where the front-ends 11-13 are connected to a plurality of input pads P1, P2, P3. Although there are three down-converting paths in this embodiment, the present invention is not limited thereto. In practice, the number of down-converting paths may be more than or fewer than three. For example, the receiver apparatus 100 may be configured to have a single front-end (e.g. the front-end 13) for processing a radio-frequency (RF) signal arriving at a corresponding input pad (e.g. the input pad P3), and this also belongs to the scope of the present invention.

Each of the front-ends 11-13 includes a down-converting stage and an amplifier stage. For example, the front-end path 11 includes a down-converting stage implemented using a mixer 115 and an amplifier stage implemented using a low noise amplifier (LNA) 116; the front-end 12 includes a down-converting stage implemented using a mixer 125 and an amplifier stage implemented using an LNA 126; and the front-end 13 includes a down-converting stage implemented using a mixer 135 and an amplifier stage implemented using an LNA 136. Each of the LNAs 116, 126 and 136 has an input port N11/N12/N13 and an output port N21/N22/N23. The output port N21/N22/N23 of each LNA 116/126/136 is coupled to a corresponding down-converting stage (i.e. mixers 115/125/135).

In this embodiment, the blocker detection path 20 includes a voltage-mode signal sensing circuit 70, a processing circuit 80, a blocker detection circuit 60, and a selector 90. Specifically, in a case that only the switch S3 is short circuit, while the switches S1, S2 are open circuit, the voltage-mode signal sensing circuit 70 consists of $R_{13}$ and R2. That is, the resistor R3 converts the sensed voltage signal into a current signal as indicated by an output signal K2 flowing through the resistor R3. However, this is merely for illustrative purposes, not a limitation to the present invention. In some modification of this embodiment, the voltage-mode signal sensing circuit is replaced with a current-mode signal sensing circuit.

As shown in FIG. 1, the voltage-mode signal sensing circuit 70 is coupled to the input port N11/N12/N13 of each LNA 116/126/136, thereby allowing the blocker power to be directly observed without any filtering at the LNA input. Suppose that the blocker detection path 20 is used to detect the existence of the unwanted blocker when a radio frequency (RF) signal RF_IN is fed into the receiver path 10 via the input pad P3. As the voltage-mode signal sensing circuit 70 is coupled to the input port N13 of the LNA 136 located at the front-end 13 connected to the input pad P3, the voltage-mode signal sensing circuit 70 will receive the RF signal RF_IN which is about to be processed by the LNA 136. In other words, the voltage-mode signal sensing circuit 70 is arranged to sense the received RF signal RF_IN which has not yet been processed by the down-converting stage (i.e. mixer 135) of the front-end 13, and generate a sensed signal K1 accordingly. In this embodiment, the receiver apparatus 100 can flexibly choose one front-end input to detect blocker signals therein. As shown in FIG. 1, the voltage-mode signal sensing circuit 70 includes a plurality of switches S1, S2, S3 and a plurality of resistors $R_{11}$, $R_{12}$, $R_{13}$, $R_2$, $R_3$. When the blocker detection path 20 is controlled to detect blocker signals within an RF signal fed into the LNA 116 of the front-end 11, the switch S1 is switched on, and the switches S2, S3 are switched off; when the blocker detection path 20 is controlled to detect blocker signals within an RF signal fed into the LNA 126 of the front-end 12, the switch S2 is switched on, and the switches S1, S3 are switched off; and when the blocker detection path 20 is controlled to detect blocker signals within an RF signal fed into the LNA 136 of the front-end 13, the switch S3 is switched on, and the switches S1, S2 are switched off. The switches S1-S3 can connect the blocker detection path 20 to different LNA inputs to detect and calibrate different RF signal input ports. Concerning the case shown in FIG. 1, the switch S3 is switched on such that the RF signal RF_IN in front of the LNA 136 is sensed by the voltage-mode signal sensing circuit 70.

When one of the switches S1-S3 is switched on, the resistor $R_2$ and one of the resistors $R_{11}$, $R_{12}$, $R_{13}$ can form a voltage divider (e.g. the voltage divider 72) which is used for performing a voltage division upon the received RF signal RF_IN to generate an output signal K2. In a case where $R_{11}=R_{12}=R_{13}=R_1$, the output signal K2 is a voltage-mode signal which may be generally represented by $$RF\_IN \cdot \frac{R_2}{R_1+R_2}.$$

The resistance values of the resistors R1-R3 can be arranged to be over 1 Kohm. Please note that the present invention is not limited to using resistors to form the voltage-mode signal sensing circuit 70, and the resistors R1-R3 can be replaced by other passive elements.

By using the high-impedance voltage-mode signal sensing circuit 70, the parasitic effect in the blocker detection path 20 can be minimized, wherein the inputs of LNAs 116, 126 and 136 remain nearly unchanged. More specifically, concerning the received RF signal RF_IN, an input impedance at the sensing circuit 70 is greater than an input impedance at the receiver path 10. For example, the resistance of resistors $R_{11}$-$R_{13}$ is arranged to be much greater than the input impedance of the LNAs 116, 126 and 136. This large resistance of the resistor $R_{11}$-$R_{13}$ means that desired signal isolation between the receiver path 10 and the blocker detection path 20 can be achieved.

Please note that the voltage-mode signal sensing circuit 70 may be arranged to sense the received RF signal at the input port or the output port of the LNA 116/126/136 based on design requirements, since the difference of the signal amplitude can be compensated by changing the ratio of the resistance values of the resistors $R_{11}/R_{12}/R_{13}$ and $R_2$.

The processing circuit 80 is arranged to convert the output signal K2 into the sensed signal K1. In this embodiment, the processing circuit 80 includes the resistor $R_3$, a down-converting stage implemented using a mixer 82 and a frequency selective filter implemented using a band-pass filter (BPF) 84. The down-converting stage (e.g. the mixer 82) is arranged to generate a down-converted signal K3 according to the output signal K2 generated from the voltage-mode signal sensing circuit 70 and an oscillation signal LO. The frequency selective filter (e.g. BPF 84) is arranged to perform a specific filtering operation upon the down-converted signal K3 to generate the sensed signal K1 to the detection circuit 60. By way of example, the down-converting stages (i.e. the mixers 82, 115, 125 and 135) shown in FIG. 1 may use the same oscillation signal. For example, when the voltage-mode signal sensing circuit 70 is sensing one of the LNA inputs, the oscillation signal LO used by the down-converting stage of the blocker detection path may be identical to an oscillation signal used by a down-converting stage of the receiver path 10. That is, the LO frequency used by the mixer 82 located at the blocker detection path 20 is set to the LO frequency used by the mixer 115/125/135 located at the receiver path 10 to observe a wideband signal, and the following frequency selective filter (i.e. the BPF 84) is used to select a particular intermediate frequency (IF) component to generate the sensed signal K1. Please note this is merely for illustrative purposes, and is not meant to be a limitation to the present invention. In some modifications of this embodiment, the frequency selective filter in the processing circuit 80 may be a low pass filter or a high pass filter, depending upon design considerations. Please note that the oscillation signal LO is not limited to a receiver oscillation signal, and can be replaced with a transmitter oscillation signal.

The duty cycle of the oscillation signals applied to the aforementioned down-converting stages (i.e. 82, 115, 125 and 135) is preferably set to 25% for achieving optimum receiver performance. In some modifications of this embodiment, the down-converting stages (i.e. mixers 82, 115, 125 and 135) shown in FIG. 1 may use oscillation signals with different oscillation frequencies. More specifically, any blocker detection design using the proposed parallel-path architecture shown in FIG. 1 falls within the scope of the present invention.

When the sensed signal K1 is transmitted to the detection circuit 60, the detection circuit 60 detects existence of a blocker signal according to the sensed signal K1, and generates a blocker detection result indicative of the existence of the blocker signal. After this, the gain of each of the LNAs 116, 126 and 136 may be adaptively adjusted according to the blocker detection result. Please notice that not only the gain of LNA but also those of mixers 115, 125 and 135, TIA 30, and LPF 40 can be adjusted. In this embodiment, the detection circuit 60 includes a comparator 62, a latch 64 and a successive approximation register (SAR) 66, but this is merely for illustrative purposes and any blocker detection mechanism capable of detecting existence of a blocker signal maybe employed to realize the detection circuit 60. As a person skilled in the art can readily understand the principle of the detection circuit 60 shown in FIG. 1, further description is omitted here for brevity.

Please note that the detection circuit 60 generates a blocker detection result, and an auto gain controller (AGC) (not shown in FIG. 1) can be arranged to adjust the gain of the receiver path 10. For example, if it is detected that the blocker power in the received RF signal RF_IN is large, the detection circuit 60 can control the AGC to enter a high power mode to improve the circuit linearity performance and thus the blocker issue can be mitigated. The gain of the LNAs 116, 126 and 136, the mixers 115, 125 and 135, and/or TIA 30 can be adaptively adjusted by the AGC according to the blocker detection result of the detection circuit 60. Further, if it is detected that the blocker power in the received RF signal RF_IN is very large, the detection circuit 60 can control the AGC to dynamically lower the gain of the LNAs 116, 126 and 136, the mixers 115, 125 and 135, and/or TIA 30 to increase the blocker test margin.

In this embodiment, the detection circuit 60 may be used to detect an in-band/adjacent channel interference (ACI) blocker or an out-of-band blocker, i.e. the receiver apparatus 100 supports both an in-band/ACI blocker detection mode and an out-of-band blocker detection mode. In FIG. 1, the selector 90 is arranged to selectively output the sensed signal K1 generated from the voltage-mode signal sensing circuit 70 or another sensed signal K1' derived from the receiver path 10 to the blocker detection circuit 60. For example, another sensed signal K1' is derived from a down-converted signal generated from one of the down-converting stages (i.e. the mixers 115, 125 and 135) of the receiver path 10. Specifically, another sensed signal K1' is obtained from an input port N3 of the LPF 40 coupled to the mixers 115, 125, 135.

When receiving the other sensed signal K1', the blocker detection circuit 60 is further arranged to detect the existence of the blocker signal according to the other sensed signal K1'. By way of example, the selector 90 may be implemented using a multiplexer or a switch-based device. In this embodiment, the selector 90 includes switches S4 and S5. When the switch S4 is switched off and the switch S5 is switched on (as depicted in FIG. 1), the out-of-band blocker detection mode is enabled due to transmission of the sensed signal K1. In another embodiment, when the switch S4 is switched on and the switch S5 is switched off, the in-band/ACI blocker detection mode is enabled due to transmission of the another sensed signal K1'. In this way, the receiver apparatus 100 of the present invention can flexibly observe the signal at the input ports of the LNAs 116, 126 and 136, or observe the signal at the input port of the LPF 40.

In summary, the present invention is capable of detecting blockers of the received RF signal on the receiver path 10 which has not yet been processed by a down-converting stage (preferably, in front of the LNA), and generating a blocker detection result. An auto gain controller can be further utilized to adjust the gain of the receiver path according to the blocker detection result. Also, the detection circuit 60 can be utilized to detect blockers in the received signal which has been processed by a down-converting stage of the receiver path 10 through a selector such as the selector 90. Moreover, the present invention can flexibly select a target LNA input to detect through switches S1-S3. The input impedance at the voltage-mode signal sensing circuit 70 is greater than the input impedance at the receiver path, such that desired signal isolation between the receiver path 10 and the blocker detection path 20 is provided.

Figure 2:
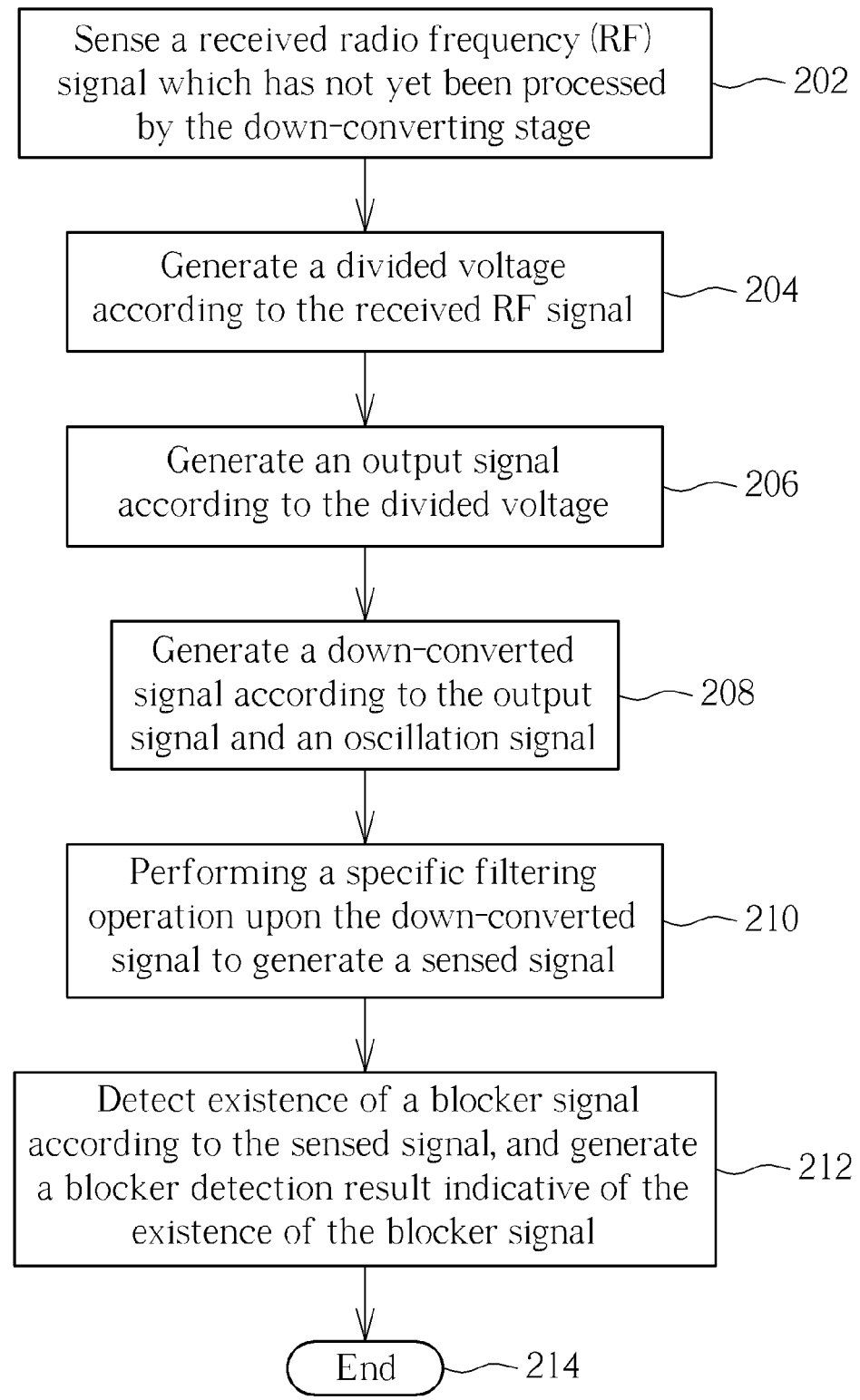
FIG. 2 is a flowchart illustrating a blocker detection method according to an embodiment of the present invention.

Please refer to FIG. 2, which is a flowchart illustrating a blocker detection method according to an embodiment of the present invention. The exemplary blocker detection method may be employed by the receiver apparatus 100 shown in FIG. 1, and can be briefly summarized by the following steps.

Step 202: Sense a received radio frequency (RF) signal which has not yet been processed by the down-converting stage.

Step 204: Generate a divided voltage according to the received RF signal.

Step 206: Generate an output signal according to the divided voltage.

Step 208: Generate a down-converted signal according to the output signal and an oscillation signal.

Step 210: Perform a specific filtering operation upon the down-converted signal to generate a sensed signal.

Step 212: Detect existence of a blocker signal according to the sensed signal, and generate a blocker detection result indicative of the existence of the blocker signal.

Step 214: End.

It should be noted that the steps are not required to be executed in the exact order shown in FIG. 2: other steps can be inserted and some steps can be skipped. As a person skilled in the art can readily understand details of each step shown in FIG. 2 after reading the above paragraphs directed to the receiver apparatus 100 shown in FIG. 1, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiver apparatus, comprising:
   a receiver path, comprising a down-converting stage; and
   a blocker detection path, comprising:
      a sensing circuit, arranged to sense a received radio frequency (RF) signal which has not yet been processed by the down-converting stage and generate a sensed signal accordingly;
      a blocker detection circuit, arranged to detect existence of a blocker signal according to the sensed signal and generate a blocker detection result indicative of the existence of the blocker signal when receiving the sensed signal; and
   a selector, arranged to selectively output the sensed signal generated from the sensing circuit or another sensed signal derived from the receiver path to the blocker detection circuit, wherein the other sensed signal is derived from a down-converted signal generated from the down-converting stage, and when receiving the other sensed signal, the blocker detection circuit is further arranged to detect the existence of the blocker signal according to the other sensed signal.

2. The receiver apparatus of claim 1, wherein the receiver path further comprises a low noise amplifier (LNA) having an input port and an output port, the output port of the LNA is coupled to the down-converting stage, and the sensing circuit is coupled to the input port of the LNA for receiving the received RF signal to be processed by the LNA.

3. The receiver apparatus of claim 1, wherein concerning the received RF signal, an input impedance at the sensing circuit is greater than an input impedance at the receiver path.

4. The receiver apparatus of claim 1, wherein the sensing circuit is arranged to generate an output signal according to the received RF signal; and the sensing circuit further comprises a processing circuit which is arranged to convert the output signal into the sensed signal.

5. The receiver apparatus of claim 4, wherein the signal sensing circuit comprises a voltage divider.

6. The receiver apparatus of claim 4, wherein the processing circuit comprises:
   a down-converting stage, arranged to generate a down-converted signal according to the output signal generated from the signal sensing circuit and an oscillation signal; and
   a frequency selective filter, arranged to perform a specific filtering operation upon the down-converted signal to generate the sensed signal.

7. The receiver apparatus of claim 6, wherein the oscillation signal used by the down-converting stage of the blocker detection path is identical to an oscillation signal used by the down-converting stage of the receiver path.

8. The receiver apparatus of claim 6, wherein the oscillation signal has a 25% duty cycle.

9. The receiver apparatus of claim 1, wherein the receiver path further comprises a frequency selective filter having an input port coupled to the down-converting stage, and the selector is coupled to the input port of the frequency selective filter for receiving the other sensed signal to be processed by the blocker detection circuit.

10. A blocker detection method applied to a receiver path comprising a down-converting stage, the blocker detection method comprising:
    sensing a received radio frequency (RF) signal which has not yet been processed by the down-converting stage, and generating a sensed signal accordingly;
    when receiving the sensed signal, detecting existence of a blocker signal according to the sensed signal, and generating a blocker detection result indicative of the existence of the blocker signal;
    selectively outputting the sensed signal or another sensed signal wherein the other sensed signal is derived from a down-converted signal generated from the down-converting stage, and
    when receiving the other sensed signal, detecting the existence of the blocker signal according to the other sensed signal.

11. The blocker detection method of claim 10, wherein the receiver path further comprises a low noise amplifier (LNA) having an input port and an output port, the output port of the LNA is coupled to the down-converting stage, and the received RF signal is obtained from the input port of the LNA.

12. The blocker detection method of claim 10, further comprising:
    generating an output signal according to the received RF signal under a voltage mode; and
    converting the output signal into the sensed signal.

13. The blocker detection method of claim 12, wherein the step of generating the output signal according to the received RF signal under the voltage mode comprises:
    performing a voltage division upon the received RF signal to generate the output signal.

14. The blocker detection method of claim 12, wherein the step of converting the output signal into the sensed signal comprises:
    generating a down-converted signal according to the output signal and an oscillation signal; and
    performing a specific filtering operation upon the down-converted signal to generate the sensed signal.

15. The blocker detection method of claim 14, wherein the oscillation signal used for generating the down-converted signal is identical to an oscillation signal used by the down-converting stage of the receiver path.

16. The blocker detection method of claim 14, wherein the oscillation signal has a 25% duty cycle.

17. The blocker detection method of claim 10, wherein the receiver path further comprises a frequency selective filter having an input port coupled to the down-converting stage, and the other sensed signal is obtained from the input port of the frequency selective filter.

\* \* \* \* \*